United States Patent
Zent et al.

(10) Patent No.: US 12,103,608 B2
(45) Date of Patent: Oct. 1, 2024

(54) TRACTION CONTROL FOR STEERING ARTICULATED POWER MACHINE

(71) Applicant: Clark Equipment Company, West Fargo, ND (US)

(72) Inventors: Kevin J. Zent, Bismarck, ND (US); Daniel J. Krieger, Bismarck, ND (US)

(73) Assignee: Doosan Bobcat North America Inc., West Fargo, ND (US)

( * ) Notice: Subject to any disclaimer, the term of this patent is extended or adjusted under 35 U.S.C. 154(b) by 0 days.

(21) Appl. No.: 17/723,011

(22) Filed: Apr. 18, 2022

(65) Prior Publication Data

US 2023/0077263 A1    Mar. 9, 2023

Related U.S. Application Data

(63) Continuation of application No. 16/799,188, filed on Feb. 24, 2020, now Pat. No. 11,305,812.

(60) Provisional application No. 62/809,174, filed on Feb. 22, 2019.

(51) Int. Cl.
| | |
|---|---|
| *B62D 5/10* | (2006.01) |
| *B62D 1/04* | (2006.01) |
| *B62D 5/065* | (2006.01) |
| *B62D 5/07* | (2006.01) |
| *B62D 63/02* | (2006.01) |

(52) U.S. Cl.
CPC .............. *B62D 5/10* (2013.01); *B62D 1/04* (2013.01); *B62D 5/065* (2013.01); *B62D 5/075* (2013.01); *B62D 63/02* (2013.01)

(58) Field of Classification Search
CPC . B62D 1/04; B62D 5/10; B62D 5/065; B62D 5/075; B62D 63/02; B62D 11/001; B62D 11/02; B62D 11/06; B62D 11/005; B62D 12/00; B60W 10/103; B60W 30/18172; B60W 2720/406; B60K 7/0015; B60K 17/356; B60Y 2200/415; B60Y 2200/417; B60Y 2720/406; B60Y 10/103
USPC ........................................ 180/6.5, 6.48, 418
See application file for complete search history.

(56) References Cited

U.S. PATENT DOCUMENTS

| | | |
|---|---|---|
| 3,865,208 A | 2/1975 | Crawshay et al. |
| 3,910,369 A | 10/1975 | Chichester et al. |
| 5,427,195 A | 6/1995 | Paul et al. |
| 5,647,211 A | 7/1997 | Harber et al. |
| 5,732,789 A | 3/1998 | Stephenson |
| 5,775,453 A | 7/1998 | Williams et al. |
| 5,899,292 A | 5/1999 | Paul et al. |
| 6,174,255 B1 | 1/2001 | Porter et al. |
| 6,922,992 B1 | 8/2005 | Morgan |
| 6,991,058 B2 | 1/2006 | Cousin et al. |

(Continued)

FOREIGN PATENT DOCUMENTS

DE    4219876 A1    12/1992

OTHER PUBLICATIONS

Notice of Allowance and Fee(s) Due for U.S. Appl. No. 16/799,188, mailed Dec. 21, 2021, 10 pages.

*Primary Examiner* — Tony H Winner
*Assistant Examiner* — Felicia L. Brittman-Alabi
(74) *Attorney, Agent, or Firm* — Westman, Champlin & Koehler, P.A.

(57) ABSTRACT

Disclosed embodiments include steering circuits utilizing a controllable cross-feed loop between left and right drive motor sides of an articulated power machine to reduce skidding caused by a turning operation in which an articulation actuator changes an articulation joint angle between a front frame member and a rear frame member of the power machine.

18 Claims, 5 Drawing Sheets

(56) References Cited

U.S. PATENT DOCUMENTS

| | | |
|---|---|---|
| 7,017,703 B2 | 3/2006 | Smalley |
| 7,090,045 B2 | 8/2006 | Okada et al. |
| 7,357,214 B2 | 4/2008 | Ho et al. |
| 7,377,353 B2 | 5/2008 | Smalley |
| 7,377,354 B2 | 5/2008 | Smalley |
| 8,002,073 B2 | 8/2011 | Nozaki et al. |
| 8,448,741 B2 | 5/2013 | Breiner et al. |
| 8,862,359 B2 | 10/2014 | Brand |
| 9,266,420 B2 | 2/2016 | Edward |
| 10,036,460 B2 | 7/2018 | Ge |
| 2008/0189017 A1 | 8/2008 | Ryyppo |
| 2009/0211834 A1 | 8/2009 | Yasuda et al. |
| 2012/0221222 A1 | 8/2012 | Anderson et al. |
| 2014/0123636 A1 | 5/2014 | Prigent et al. |

TRACTION CONTROL FOR STEERING ARTICULATED POWER MACHINE

CROSS-REFERENCE TO RELATED APPLICATION

This application claims the benefit of U.S. Provisional Application No. 62/809,174, which was filed on Feb. 22, 2019.

BACKGROUND

This disclosure is directed toward power machines. More particularly, this disclosure is directed to steering articulated power machines and to traction control systems for steering articulated power machines.

Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

In steering articulated power machines, when turning, an angle of an articulation joint between front and rear portions of the machine is changed by one or more articulation actuators. When the angle of the articulation joint is changing, one or more wheels of the power machine can skid across the ground or other support surface. This can be undesirable, particularly when operating the power machine on turf or other surfaces that can be damaged.

The discussion above is merely provided for general background information and is not intended to be used as an aid in determining the scope of the claimed subject matter.

SUMMARY

In exemplary embodiments, an articulated power machine (100; 200) includes a front frame member (212), a rear frame member (214), an articulation joint (216) rotatably coupling the front and rear frame members, and an articulation angle actuator (370) configured to turn the power machine by changing an articulation angle of the articulation joint. A drive pump (224A) of a power conversion system (224) and a steering control circuit (324) selectively provides a flow of hydraulic fluid. Left side drive motors (226C; 226D) are coupled to the drive pump and configured in series to receive hydraulic fluid flow from the drive pump to rotate left side tractive elements (242A; 244A). Right side drive motors (226A; 226B) are coupled to the drive pump and configured in series to receive hydraulic fluid flow from the drive pump to rotate right side tractive elements (242B; 244B), the right side drive motors being coupled to the drive pump in parallel with the left side drive motors. A cross-feed loop (340) including a control valve (330) is provided in the steering control circuit and selectively provides a fluid path from a connection (342) between the left side drive motors to a connection (344) between the right side drive motors. A steering control unit (365) is configured to control the articulation angle actuator to change the articulation angle of the articulation joint when a turning operation is underway. The steering control unit is further configured to generate a control signal (332) to control the control valve (330) to provide the fluid path through the cross-feed loop (340) only when controlling the articulation angle actuator to change the angle of the articulation joint during the turning operation. When the turning operation is not underway, the control valve blocks the fluid path through the cross-feed loop. This allows the tractive element or wheels to turn when urged to do so by the action of the articulation actuator to change the articulation angle, and reduces skidding as a result.

One general aspect includes an articulated power machine (100, 200) including: a front frame member (212), a rear frame member (214), an articulation joint (216) rotatably coupling the front and rear frame members, an articulation angle actuator (370) configured to turn the power machine by changing an articulation angle of the articulation joint, a hydraulic steering circuit (324) including: a drive pump (224A), left side drive motors (226C, 226D) coupled to the drive pump and configured to receive hydraulic fluid flow from the drive pump to rotate left side tractive elements (242A, 244A), right side drive motors (226A, 226B) coupled to the drive pump and configured to receive hydraulic fluid flow from the drive pump to rotate right side tractive elements (242B, 244B), and a cross-feed loop (340) configured to selectively provide a fluid path from a connection (342) between the left side drive motors to a connection (344) between the right side drive motors. The articulated power machine also includes a steering control unit (365) configured to control the articulation angle actuator to change the articulation angle of the articulation joint when a turning operation is underway, where the steering control unit is further configured to generate a control signal (332) to control the fluid path through the cross-feed loop such that the fluid path through the cross-feed loop is provided only when controlling the articulation angle actuator to change the angle of the articulation joint during the turning operation, and not when a turning operation is not underway.

Implementations may include one or more of the following features. The articulated power machine where the cross-feed loop (340) includes a first hydraulic pathway (348) coupled to the connection (342) between the left side drive motors, a second hydraulic pathway (346) coupled to the connection (344) between the right side drive motors, and a control valve (330) coupled between the first hydraulic pathway (348) and the second hydraulic pathway (346), the control valve selectively providing the fluid path from the connection (342) between the left side drive motors to the connection (344) between the right side drive motors responsive to the control signal.

The articulated power machine where the left side drive motors (226C; 226D) are configured in series with each other to receive hydraulic fluid flow from the drive pump to rotate the left side tractive elements (242A; 244A), where the right side drive motors (226A; 226B) are configured in series with each other to receive hydraulic fluid flow from the drive pump to rotate right side tractive elements (242B; 244B), and where the right side drive motors are coupled to the drive pump in parallel with the left side drive motors. The articulated power machine where the drive pump is coupled in parallel with the right side drive motors and with the left side drive motors. The articulated power machine where the connection (342) between the left side drive motors is a series connection between the left side drive motors, and where the connection (344) between the right side drive motors is a series connection between the right side drive motors.

The articulated power machine and further including a steering input device (360) configured to be manipulated by an operator to control turning operations by responsively generating steering input signals, where the steering control unit (365) is configured to control the articulation angle actuator and to generate the control signal (332) responsive to the steering input signals.

The articulated power machine and further including a traction lock circuit (322) having a first solenoid-controlled valve (325) coupled between one of the left side drive motors (226D) and the drive pump (224A) and having a second solenoid-controlled valve (326) coupled between one of the right side drive motors (226B) and the drive pump (224A). The articulated power machine where the traction lock circuit further includes a first restricting orifice (318) coupled between the one of the left side drive motors (226D) and the drive pump (224A) and a second restricting orifice (320) coupled between the one of the right side drive motors (226B) and the drive pump (224A).

Another general aspect includes an articulated power machine (100; 200) including: a front frame member (212); a rear frame member (214); an articulation joint (216) rotatably coupling the front and rear frame members; an articulation angle actuator (370) configured to turn the power machine by changing an articulation angle of the articulation joint; a drive pump (224A); left side drive motors (226C; 226D) coupled to the drive pump and configured in series with each other to receive hydraulic fluid flow from the drive pump to rotate left side tractive elements (242A; 244A); right side drive motors (226A; 226B) coupled to the drive pump and configured in series with each other to receive hydraulic fluid flow from the drive pump to rotate right side tractive elements (242B; 244B), the right side drive motors being coupled to the drive pump in parallel with the left side drive motors; a cross-feed loop (340) including a control valve (330) and selectively providing a fluid path from a connection (342) between the left side drive motors to a connection (344) between the right side drive motors; and a steering control unit (365) configured to control the articulation angle actuator to change the articulation angle of the articulation joint when a turning operation is underway, where the steering control unit is further configured to generate a control signal (332) to control the control valve to provide the fluid path through the cross-feed loop only when controlling the articulation angle actuator to change the angle of the articulation joint during the turning operation, the control valve blocking the fluid path through the cross-feed loop when a turning operation is not underway.

Implementations may include one or more of the following features. The articulated power machine where the cross-feed loop (340) includes a first hydraulic pathway (348) coupled between the connection (342) between the left side drive motors and the control valve (330), and a second hydraulic pathway (346) coupled between the connection (344) between the right side drive motors and the control valve (330), the control valve selectively providing the fluid path from the connection (342) between the left side drive motors, through the first and second fluid pathways (348; 346), to the connection (344) between the right side drive motors responsive to the control signal.

The articulated power machine where the connection (342) between the left side drive motors is a series connection between the left side drive motors, and where the connection (344) between the right side drive motors is a series connection between the right side drive motors.

The articulated power machine and further including a steering input device (360) configured to be manipulated by an operator to control turning operations by responsively generating steering input signals, where the steering control unit (365) is configured to control the articulation angle actuator and to generate the control signal (332) responsive to the steering input signals.

The articulated power machine and further including a traction lock circuit (322) having a first solenoid-controlled valve (325) coupled between one of the left side drive motors (226D) and the drive pump (224A) and having a second solenoid-controlled valve (326) coupled between one of the right side drive motors (226B) and the drive pump (224A). The articulated power machine where the traction lock circuit further includes a first restricting orifice (318) coupled between the one of the left side drive motors (226D) and the drive pump (224A) and a second restricting orifice (320) coupled between the one of the right side drive motors (226B) and the drive pump (224A).

This Summary and the Abstract are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

DRAWINGS

DESCRIPTION

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include a drive circuit for an articulated frame power machine. The drive circuit has drive motors for each of two front wheels and two rear motors on left and right sides of the machine. The front and rear drive motors on each of the left and right sides are in series. The left and right sides of the drive circuit are in parallel with each other. This arrangement advantageously provides for improved traction in rough terrain. However, using an arrangement of this type can result in skidding of one or more wheels during a turn (i.e. during an articulation of the frame.

The disclosed embodiments utilize a controllable cross-feed loop between left and right drive motor sides of an articulated power machine steering circuit. The cross-feed loop is provided to reduce skidding caused by a turning operation in which an articulation actuator changes an articulation joint angle between a front frame member and a rear frame member of the power machine. By allowing hydraulic fluid flow through the cross-feed loop between the left and right sides of the power machine, only during turning operations, the wheels or tractive elements are allowed to turn when urged to do so by the forces imposed by the articulation actuator's change of the articulation angle. This helps reduce skidding, particularly at low power machine speeds.

The disclosed embodiments advantageously provide for a signal that indicates when articulation has been commanded. When this signal is provided to cross-feed loop circuit, the cross-feed loop is activated, thereby providing its advantages to the drive circuit.

Figure 2:
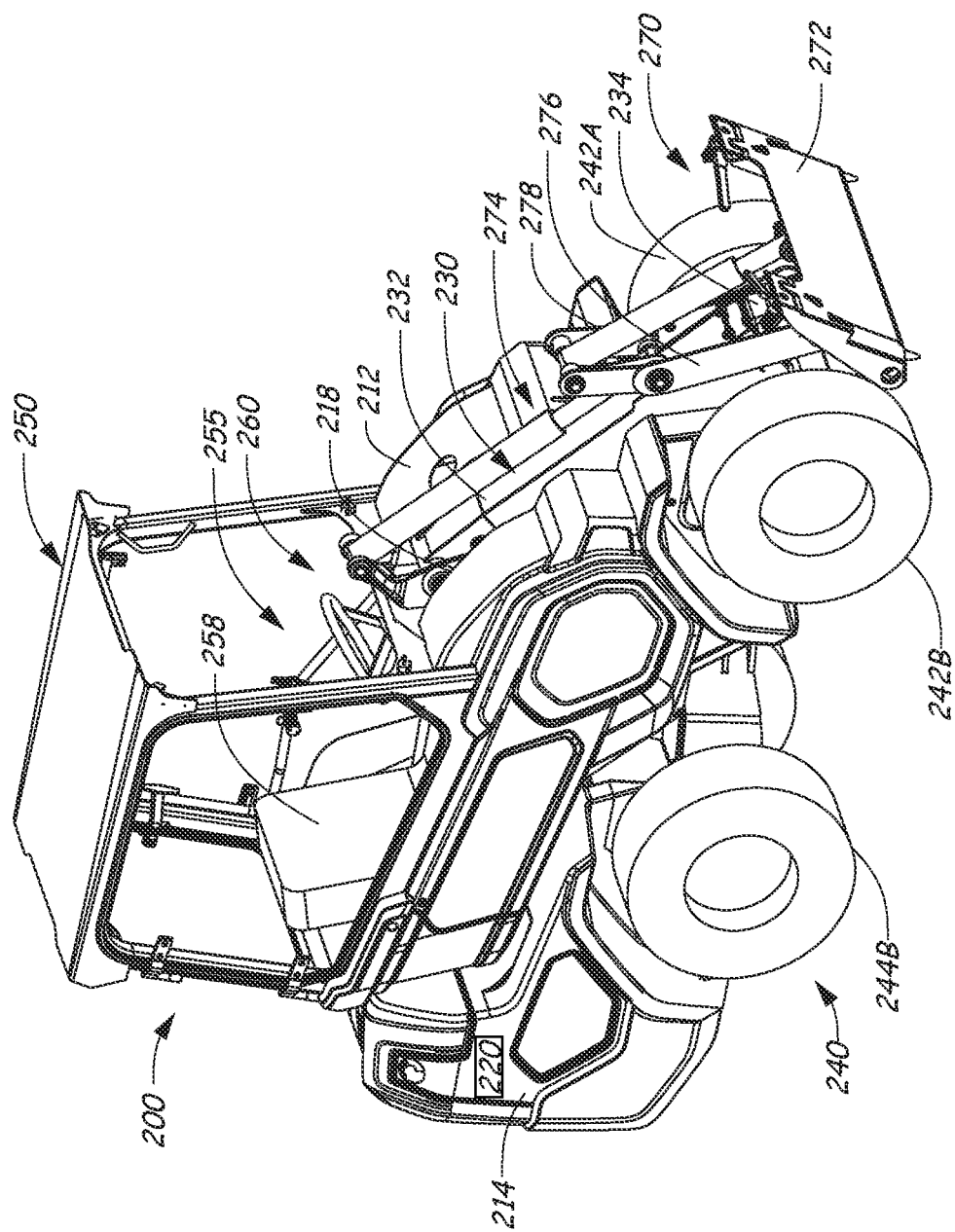
FIG. 2 is a perspective view showing generally a front of a power machine in the form of a small articulated loader on which embodiments disclosed in this specification can be advantageously practiced.
Figure 3:
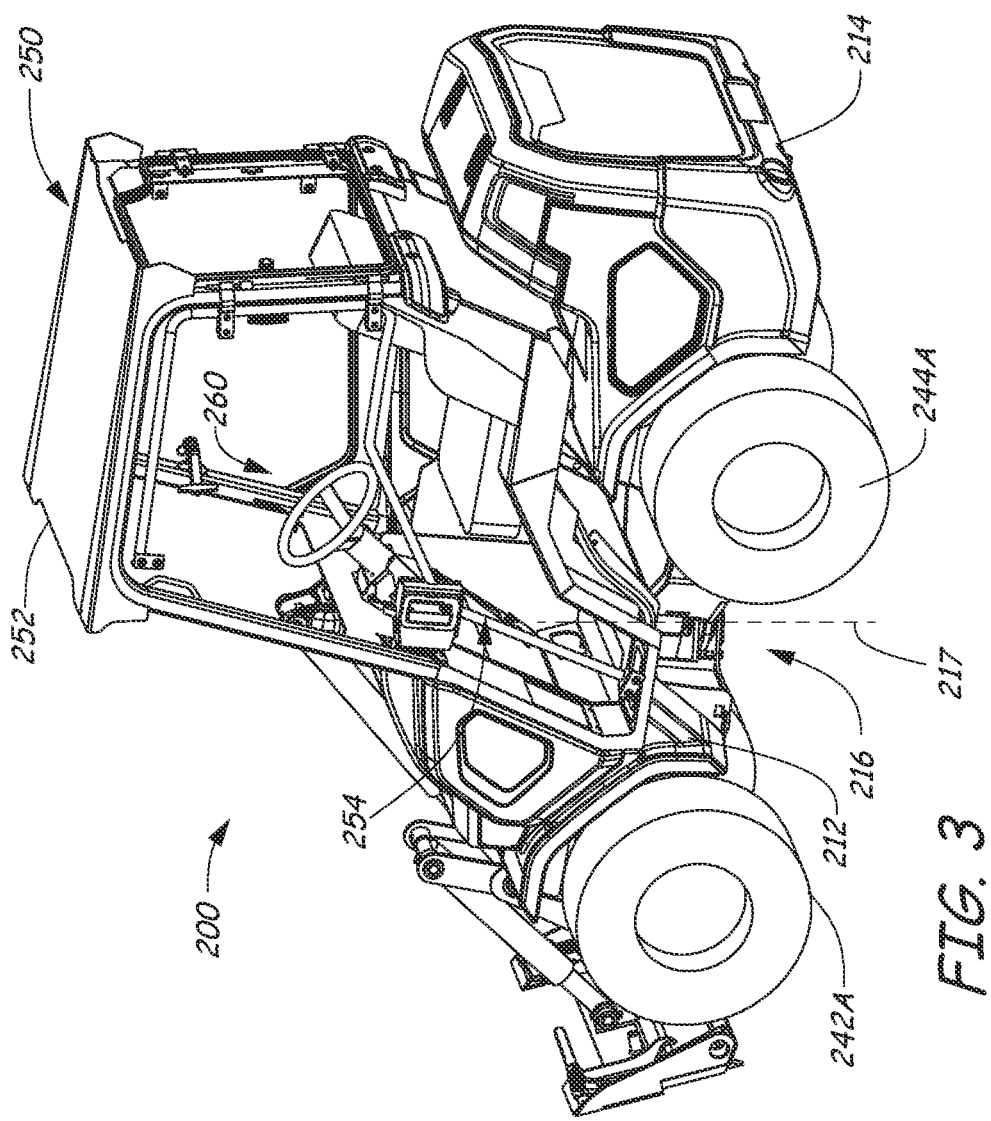
FIG. 3 is a perspective view showing generally a back of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
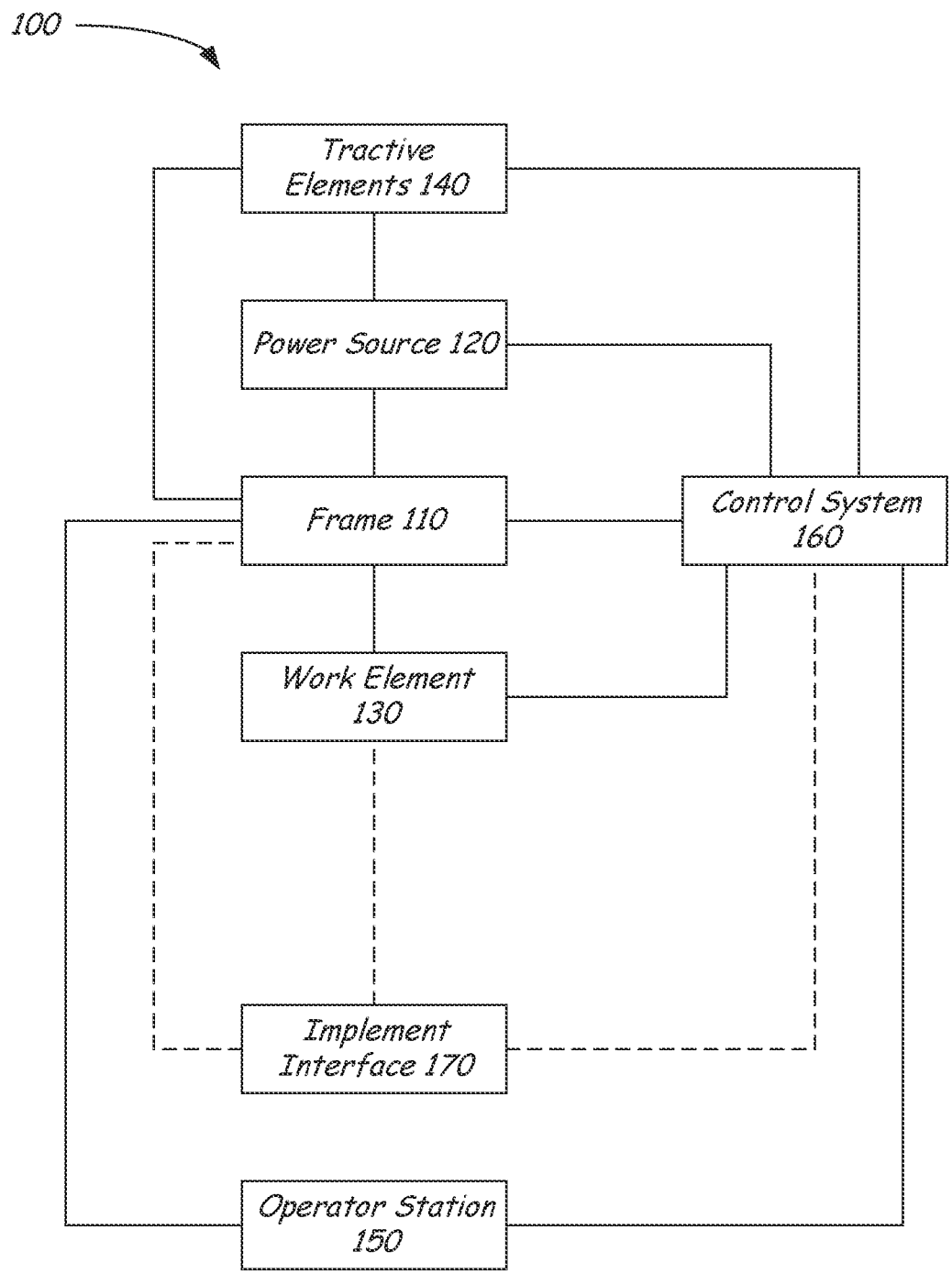
FIG. 1 is a block diagram illustrating functional systems of a representative power machine on which embodiments of the present disclosure can be advantageously practiced.

FIG. 1 is a block diagram illustrating the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. In some instances, the implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, the implement carrier is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments, operator positions or neither, may be capable of being operated remotely (i.e. from a remotely located operator station) instead of or in addition to an operator station adjacent to or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator-controlled functions on the power machine.

FIGS. 2-3 illustrates a loader 200, which is one particular example of a power machine of the type illustrated in FIG. 1 where the embodiments discussed below can be advantageously employed. Loader 200 is an articulated loader with a front mounted lift arm assembly 230, which in this example is a telescopic lift arm. Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The description herein of loader 200 with references to FIGS. 2-3 provides an illustration of the environment in which the embodiments discussed below and this description should not be considered limiting especially as to the description of features that loader 200 that are not essential to the disclosed embodiments. Such features may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise provide power for operating various functions on the power machine. Frame 210 also supports a work element in the form of lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270 that includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices to cause the power machine to perform various work functions. Cab 250 includes a canopy 252 that provides a roof for the operator compartment and is configured to have an entry 254 on one side of the seat (in the example shown in FIG. 3, the left side) to allow for an operator to enter and exit the cab. Although cab 250 as shown does not include any windows or doors, a door or windows can be provided.

The operator station 255 includes an operator seat 258 and the various operation input devices 260, including control levers that an operator can manipulate to control various machine functions. Operator input devices can include a steering wheel, buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive system 240, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interact with the embodiments discussed below can have various different frame components that support various work elements. The elements of frame 210 discussed herein are provided for illustrative purposes and should not be considered to be the only type of frame that a power machine on which the embodiments can be practiced can employ. As mentioned above, loader 200 is an articulated loader and as such has two frame members that are pivotally coupled together at an articulation joint. For the purposes of this document, frame 210 refers to the entire frame of the loader. Frame 210 of loader 200 includes a front frame member 212 and a rear frame member 214. The front and rear frame members 212, 214 are coupled together at an articulation joint 216. Actuators (not shown) are provided to rotate the front and rear frame members 212, 214 relative to each other about an axis 217 to accomplish a turn.

The front frame member 212 supports and is operably coupled to the lift arm 230 at joint 216. A lift arm cylinder (not shown, positioned beneath the lift arm 230) is coupled to the front frame member 212 and the lift arm 230 and is operable to raise and lower the lift arm under power. The front frame member 212 also supports front wheels 242A and 242B. Front wheels 242A and 242B are mounted to rigid axles (the axles do not pivot with respect to the front frame member 212). The cab 250 is also supported by the front frame member 212 so that when the front frame member 212 articulates with respect to the rear frame member 214, the cab 250 moves with the front frame member 212 so that it will swing out to either side relative to the rear frame member 214, depending on which way the loader 200 is being steered.

The rear frame member 214 supports various components of the power system 220 including an internal combustion engine. In addition, one or more hydraulic pumps are coupled to the engine and supported by the rear frame member 214. The hydraulic pumps are part of a power conversion system to convert power from the engine into a form that can be used by actuators (such as cylinders and drive motors) on the loader 200. Power system 220 is discussed in more detail below. In addition, rear wheels 244A and 244B are mounted to rigid axles that are in turn mounted to the rear frame member 214. When the loader 200 is pointed in a straight direction (i.e., the front frame portion 212 is aligned with the rear frame portion 214) a portion of the cab is positioned over the rear frame portion 214.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is a radial lift arm assembly, in that the lift arm is mounted to the frame 210 at one end of the lift arm assembly and pivots about the mounting joint 216 as it is raised and lowered. The lift arm assembly 230 is also a telescoping lift arm. The lift arm assembly includes a boom 232 that is pivotally mounted to the front frame member 212 at joint 216. A telescoping member 234 is slidably inserted into the boom 232 and telescoping cylinder (not shown) is coupled to the boom and the telescoping member and is operable to extend and retract the telescoping member under power. The telescoping member 234 is shown in FIGS. 2 and 3 in a fully retracted position. The implement interface 270 including implement carrier 272 and power couplers 274 are operably coupled to the telescoping member 234. An implement carrier mounting structure 276 is mounted to the telescoping member. The implement carrier 272 and the power couplers 274 are mounted to the positioning structure. A tilt cylinder 278 is pivotally mounted to both the implement carrier mounting structure 276 and the implement carrier 272 and is operable to rotate the implement carrier with respect to the implement carrier mounting structure under power. Among the operator controls 260 in the operator compartment 255 are operator controls to allow an operator to control the lift, telescoping, and tilt functions of the lift arm assembly 230.

Other lift arm assemblies can have different geometries and can be coupled to the frame of a loader in various ways to provide lift paths that differ from the radial path of lift arm assembly 230. For example, some lift paths on other loaders provide a radial lift path. Others have multiple lift arms coupled together to operate as a lift arm assembly. Still other lift arm assemblies do not have a telescoping member. Others have multiple segments. Unless specifically stated otherwise, none of the inventive concepts set forth in this discussion are limited by the type or number of lift arm assemblies that are coupled to a particular power machine.

Figure 4:
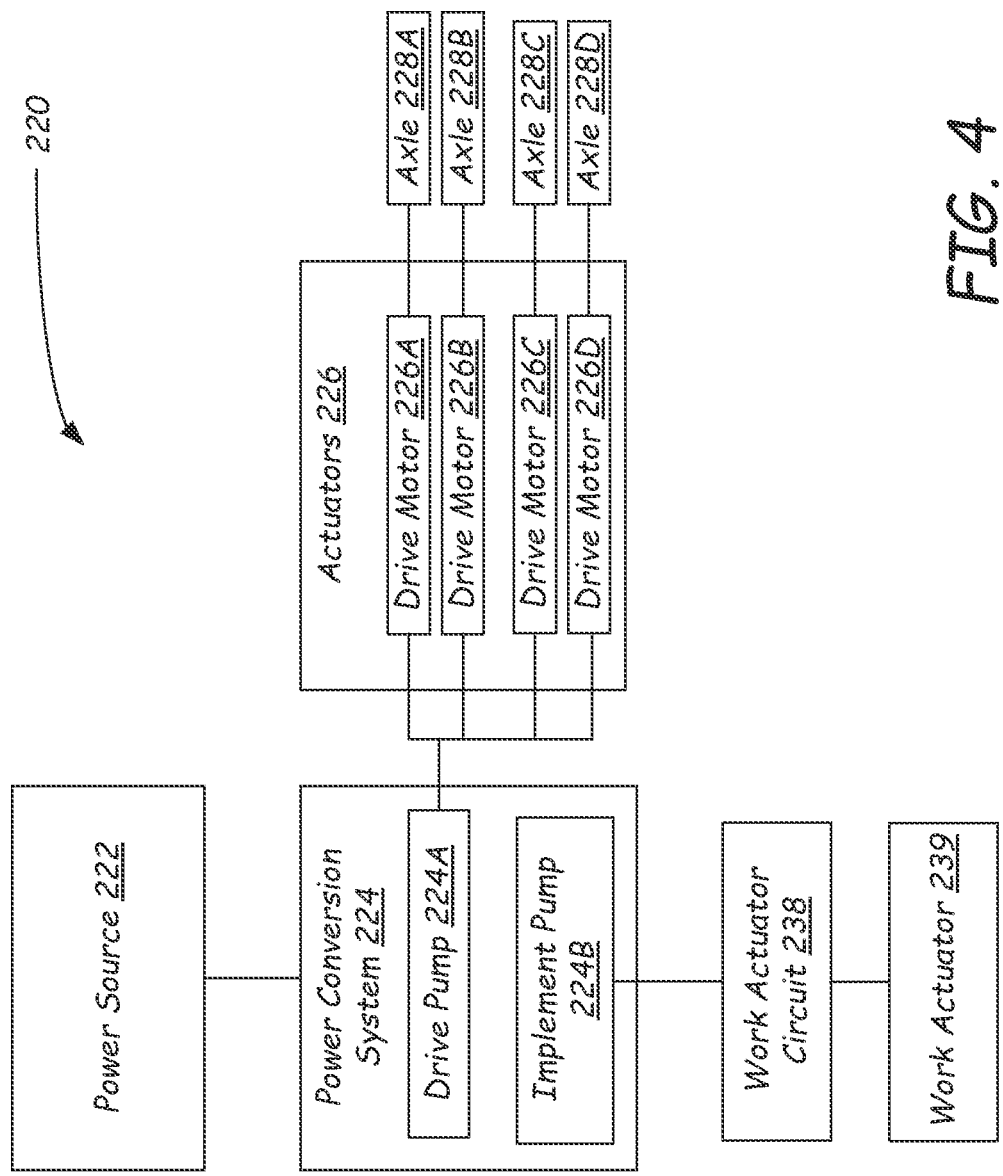
FIG. 4 is a block diagram illustrating components of a power system of a power machine such as the articulated loader illustrated in FIGS. 2-3.

FIG. 4 illustrates power system 220 in more detail. Broadly speaking, power system 220 includes one or more power sources 222 that can generate and/or store power for operating various machine functions. On loader 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a hydrostatic drive pump 224A, which provides a power signal to drive motors 226A, 226B, 226C and 226D. The four drive motors 226A, 226B, 226C and 226D in turn are each operably coupled to four axles, 228A, 228B, 228C and 228D, respectively. Although not shown, the four axles are coupled to the wheels 242A, 242B, 244A, and 244B, respectively. The hydrostatic drive pump 224A can be mechanically, hydraulically, and/or electrically coupled to operator input devices to receive actuation signals for controlling the drive pump. The power conversion system also includes an implement pump 224B, which is also driven by the power source 222. The implement pump 224B is configured to provide pressurized to a work actuator circuit 238. Work actuator circuit 238 is in communication with work actuator 239. Work actuator 239 is representative of a plurality of actuators, including the lift cylinder, tilt cylinder, telescoping cylinder, and the like. The work actuator circuit 238 can include valves and other devices to selectively provide pressurized hydraulic fluid to the various work actuators represented by block 239 in FIG. 4. In addition, the work actuator circuit 238 can be configured to provide pressurized hydraulic fluid to work actuators on an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as articulated loader 200, unless otherwise noted or recited, the concepts discussed below are not intended to be limited in their application to the environments specifically described above.

Figure 5:
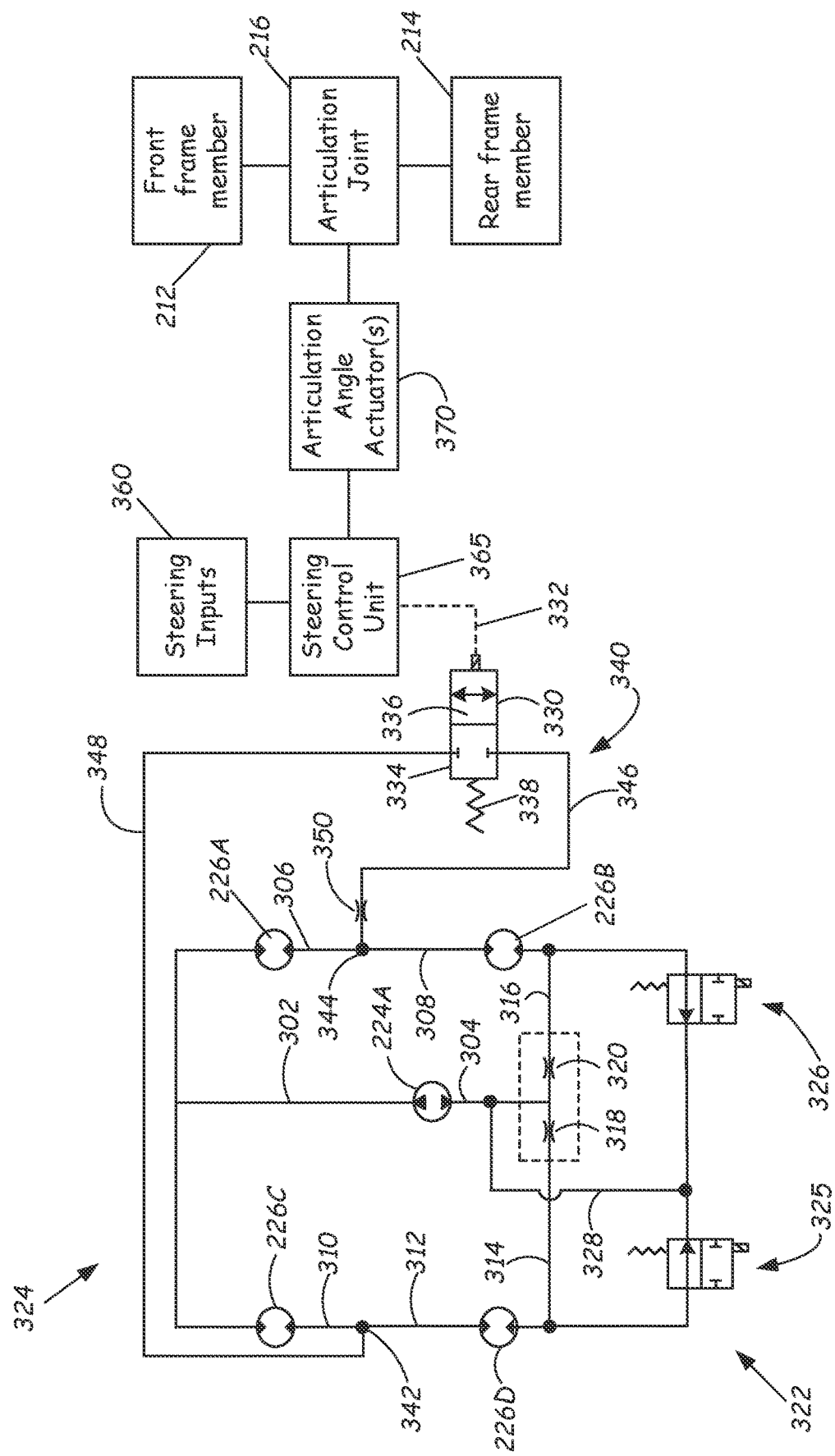
FIG. 5 is diagrammatic illustration of portions of a steering control circuit providing a cross-feed loop to reduce skidding during turning operations according to an illustrative embodiment.

Referring now to FIG. 5, shown is a hydraulic steering circuit 324 and related components useful in understanding operation of the hydraulic steering circuit. As discussed above, when an articulated loader is turning, or more accurately, when the angle of the articulation joint 216 is changing, some of the wheels 242 (shown in FIGS. 2 and 3) can skid, causing damage to some surfaces such as turf. Allowing the wheels to turn independently reduces or minimizes this effect. Steering circuit 324 includes a cross-feed loop 340 that, as described below, controls the motors 226A-226D to allow the wheels to turn freely while the angle of the articulation joint is changing, minimizing skidding.

Circuit 324 includes drive pump 224A and drive motors 226A-226D discussed above with reference to FIG. 4. In one example embodiment, bi-directional drive pump 224A is hydraulically coupled through hydraulic line(s) 302 to right and left front drive motors 226A and 226C, and through line(s) 304, 314 and 316 to right and left rear drive motors 226B and 226D. Flow restricting orifices 318 and 320 can be included, in some embodiments, between drive pump 224A and drive motors 226B and 226D or elsewhere. Right side drive motors 226A and 226B are hydraulically coupled in series through hydraulic lines 306 and 308, while left side drive motors 226C and 226D are hydraulically coupled in series through hydraulic lines 310 and 312. As mentioned above, the left and right sides are in parallel with one another. Thus, hydraulic flow from pump 224A travels through all four drive motors in one direction to cause forward travel or in another direction to cause rearward travel.

Also shown in hydraulic steering circuit 324 are a pair of solenoid-controlled valves 325 and 326, coupled respectively to drive pump 224A through a hydraulic line 328 and to each of drive motors 226B and 226D. Solenoid controlled valves 325 and 326 are portions of an optional electronically controlled traction lock circuit 322, and are not required in disclosed embodiments. Restricting orifices 318 and 320 are also a part of this traction lock circuit and are not required as part of the cross-feed circuit.

Steering inputs 360 of the power machine 200, which can be a subset of operator input devices 260 discussed with reference to FIGS. 2-3, provide steering input signals to a steering control unit 365. For example, steering inputs 360 can include a steering wheel, joystick controls, control levers or other steering control devices. Steering control unit 365 can be a suitably configured electronic control unit, a hydraulic control device or circuit, a mechanical control device or other device configured to control articulation angle actuator(s) 370, responsive to steering input signals from steering inputs 360, to control an angle of articulation joint 216 between front frame member 212 and rear frame member 214 to turn the power machine.

Steering circuit 324 impacts and controls the relationship between the four drive motors 226A-226D during a turning operation in which the angle of articulation joint 216 is changed by actuator(s) 370. To reduce skidding during such a turning operation, a cross-feed loop 340 is provided in steering circuit 324 between the left side of the machine and the right side of the machine as may be advantageous during a turning operation. Cross-feed loop 340 provides a selectively controlled bi-directional fluid path between a fluid connection point 342, which is between left side drive motors 226C and 226D and a fluid connection point 344, which is between right side drive motors 226A and 226B. Cross-feed loop 340 includes, in an exemplary embodiment, a first hydraulic line or pathway 346 coupled to connection point 344, a second hydraulic line or pathway 348 coupled to connection point 342 and a lock solenoid control valve 330 between pathways 346 and 348. A restriction 350 can also be included in one of pathways 346 and 348. The restriction 350 improves tractive effort while steering actuation is occurring. More particularly, the restriction 350 restricts flow between connection points 342 and 344 to prevent the possibility of causing a motor to rotate at too high of a speed relative to the designed speed of the motor (by providing most or all of the flow intended to be split between the left and right hand sides to only one of the left and right hand sides). Such an over speed condition can damage a motor and/or cause skidding or scuffing. In addition, in the case of such an over speed condition, tractive effort would approach zero, rendering the machine incapable of effective movement. In some embodiments, the restriction 350 is an orifice. In other embodiments, other hydraulic components can be used to achieve a similar type of restriction. The direction of flow between fluid connection point 342 and fluid connection point 344 is dependent on the direction of steering articulation.

Lock solenoid control valve 330 has a first valve position 334 which blocks cross-flow between the left and right sides of the steering control circuit, and a second valve position 336 which allows the cross-flow between the left and right sides. A spring or other bias mechanism 338 can be used to bias the control valve 330 toward the first valve positon 334 to block the cross-flow unless the steering control unit 365 is being activated by steering inputs 360, and generates a corresponding control signal 332 to command the control valve to allow the cross-flow. The steering control unit 365 provides a signal to the lock solenoid only when the steering control unit is indicating a desire to change the angle of the articulation joint 216 via signals from the steering input 360. When activated, oil from one side of circuit 324 (at connection point 344) can be provided to the other side of the circuit 324 (at connection point 342), or vice versa, to allow for the motors to move in a way that they are urged to by the effect of the turning operation. As mentioned above, orifice 350 is provided to restrict flow through the cross-feed loop 340 to prevent a lightly loaded wheel from spinning at a high rate of speed. The orifice 350 thus maintains tractive effort at an elevated level.

When the power machine is not moving (forward or backward) and a turning operation is underway (as an example a left turn where the front portion of the machine is angled to the left with respect to the rear portion), lock control valve 330 is controlled to be in the second valve position 336 allowing oil to be passed from the right hand side (at connection point 344) to the left hand side (at connection point 342) via the cross-feed loop 340. This allows the left front drive motor 226C and the left rear drive motor 226D to turn in an opposite direction from their right side counterparts, thus preventing or reducing any skidding action by the associated wheels. As the drive pump 224A begins to provide flow in one direction (e.g., forward), all of the drive motors will increase a given amount in the direction of the flow provided by the drive pump until all of the drive motors are moving in the same direction. When the steering control unit is no longer actively commanding a change in the angle of the articulation joint using articulation angle actuator(s) 370, lock control valve 330 returns to the first valve position 334 and thereby closes the cross-feed loop 340. When the cross-feed loop 340 is closed (i.e., when the operator is no longer signaling an intention to turn), the drive system returns to a higher tractive effort capability, which provides the operator both the benefit of turf friendly steering and maximum tractive effort when the machine is not being turned. Because the valve 330 is controlled in response to the steering inputs, the operator achieves these benefits without having to perform any other operation to shift valve 330.

The embodiments discussed above provide several important advantages. With a drive system designed in the series-parallel relationship described above, the power machine is capable of desirable tractive effort during normal operation. The inclusion of the cross-feed loop allows the machine to momentarily sacrifice some tractive effort to reduce the likelihood of the machine damaging turf during a turn. Another related benefit is that reducing skidding on a hard surface such as asphalt or concrete will improve tire life. The cross-feed loop is also advantageously automatically engaged in response to a steering command so that an operator does not have to initiate the use of such a loop.

Although the present invention has been described with reference to preferred embodiments, workers skilled in the art will recognize that changes may be made in form and detail to the disclosed embodiments without departing from the spirit and scope of the concepts discussed herein.

What is claimed is:

1. An articulated power machine comprising:
a front frame member;
a rear frame member;
an articulation joint rotatably coupling the front and rear frame members;
an articulation angle actuator configured to turn the power machine by changing an articulation angle of the articulation joint;
a hydraulic steering circuit comprising:
a drive pump;
left side drive motors coupled to the drive pump and configured in series to receive hydraulic fluid flow from the drive pump to rotate left side tractive elements;
right side drive motors coupled to the drive pump and configured in series to receive hydraulic fluid flow from the drive pump to rotate right side tractive elements; and
a steering control unit configured to control the articulation angle actuator to change the articulation angle of the articulation joint when a turning operation is underway, wherein the steering control unit is further configured to generate a control signal to control the hydraulic steering circuit to allow the left and right side tractive elements to rotate independently when controlling the articulation angle actuator to change the angle of the articulation joint during the turning operation, and not when a turning operation is not underway, wherein the hydraulic steering circuit further comprises a cross-feed loop configured to selectively provide a fluid path from a connection between the left side drive motors to a connection between the right-side drive motors, wherein the steering control unit is configured to generate the control signal to control the fluid path through the cross-feed loop such that the fluid path through the cross-feed loop is provided only when controlling the articulation angle actuator to change the angle of the articulation joint during the turning operation, and not when the turning operation is not underway, wherein the cross-feed loop includes a first hydraulic pathway coupled to the connection between the left side drive motors, a second hydraulic pathway coupled to the connection between the right side drive motors, and a control valve coupled between the first hydraulic pathway and the second hydraulic pathway, the control valve selectively providing the fluid path from the connection between the left side drive motors to the connection between the right side drive motors responsive to the control signal.

2. The articulated power machine of claim 1, wherein the left side drive motors are configured in series with each other to receive hydraulic fluid flow from the drive pump to rotate the left side tractive elements, wherein the right side drive motors are configured in series with each other to receive hydraulic fluid flow from the drive pump to rotate right side tractive elements, and wherein the right side drive motors are coupled to the drive pump in parallel with the left side drive motors.

3. The articulated power machine of claim 2, wherein the drive pump is coupled in parallel with the first and second right-side drive motors and with the first and second left side drive motors.

4. The articulated power machine of claim 1, and further comprising a steering input device configured to be manipulated by an operator to control turning operations by responsively generating steering input signals, wherein the steering control unit is configured to control the articulation angle actuator and to generate the control signal responsive to the steering input signals.

5. The articulated power machine of claim 1, and further comprising a traction lock circuit having a first solenoid-controlled valve coupled between one of the left side drive motors and the drive pump and having a second solenoid-controlled valve coupled between one of the right side drive motors and the drive pump.

6. The articulated power machine of claim 5, wherein the traction lock circuit further comprises a first restricting orifice coupled between the one of the first and second left side drive motors and the drive pump and a second restricting orifice coupled between the one of the first and second right side drive motors and the drive pump.

7. The articulated power machine of claim 1, wherein the first left side drive motor is a left front drive motor and the second left side drive motor is a left rear drive motor and the first right side drive motor is a right front drive motor and the second right drive motor is a right rear drive motor, wherein the steering control unit is configured such that when controlling the articulation angle actuator to change the articulation angle of the articulation joint when a turning operation is underway but the articulated power machine is not moving forward or backward, the steering control unit generates the control signal to control the hydraulic steering circuit to allow the left front drive motor and the left rear drive motor to turn in an opposite direction from the corresponding right front drive motor and right rear drive motor, thus preventing or reducing any skidding action by the associated tractive elements.

8. An articulated power machine comprising:
a front frame member;
a rear frame member;
an articulation joint rotatably coupling the front and rear frame members;
an articulation angle actuator configured to turn the power machine by changing an articulation angle of the articulation joint;
a drive pump;
left side drive motors coupled to the drive pump and configured in series with each other to receive hydraulic fluid flow from the drive pump to rotate left side tractive elements, the left side drive motors including a left front drive motor and a left rear drive motor;
right side drive motors coupled to the drive pump and configured in series with each other to receive hydraulic fluid flow from the drive pump to rotate right side tractive elements, the right side drive motors including a right front drive motor and a right rear drive motor and being coupled to the drive pump in parallel with the left side drive motors;
a cross-feed loop including a control valve and selectively providing a fluid path from a connection between the left side drive motors to a connection between the right side drive motors and a restriction positioned between the connection between the left side drive motors and the connection between the right side drive motors; and
a steering control unit in communication with a user controlled steering input and configured to control the articulation angle actuator to change the articulation angle of the articulation joint when a turning operation is underway, wherein the steering control unit is further configured to generate a control signal to control the control valve to provide the fluid path through the cross-feed loop in response to a signal received from the user controlled steering input when controlling the articulation angle actuator to change the angle of the articulation joint during the turning operation, wherein providing the fluid path through the cross-feed loop allows the left front drive motor and the left rear drive motor to turn in an opposite direction from the corresponding right front drive motor and right rear drive motor when the articulated power machine is not moving forward or backward, the control valve blocking the fluid path through the cross-feed loop when a turning operation is not underway.

9. The articulated power machine of claim 8, wherein the cross-feed loop includes a first hydraulic pathway coupled between the connection between the left side drive motors and the control valve, and a second hydraulic pathway coupled between the connection between the right side drive motors and the control valve, the control valve selectively providing the fluid path from the connection between the left side drive motors, through the first and second fluid pathways, to the connection between the right side drive motors responsive to the control signal.

10. The articulated power machine of claim 8, wherein the connection between the left side drive motors is a series connection between the left side drive motors, and wherein the connection between the right side drive motors is a series connection between the right side drive motors.

11. The articulated power machine of claim 8, and further comprising a traction lock circuit having a first solenoid-controlled valve coupled between one of the left side drive motors and the drive pump and having a second solenoid-controlled valve coupled between one of the right side drive motors and the drive pump.

12. The articulated power machine of claim 11, wherein the traction lock circuit further comprises a first restricting orifice coupled between the one of the left side drive motors and the drive pump and a second restricting orifice coupled between the one of the right side drive motors and the drive pump.

13. The articulated power machine of claim 8, wherein the restriction is an orifice sized to prevent a free flow path between the connection between the left side drive motors and the connection between the right side drive motors.

14. A method of controlling an articulated power machine, the articulated power machine having a front frame member, a rear frame member, an articulation joint rotatably coupling the front and rear frame members, an articulation angle actuator configured to turn the power machine by changing an articulation angle of the articulation joint, and a steering circuit configured to control steering of the articulated power machine, the steering circuit including a drive pump, first and second left side drive motors connected in series, the first and second left side drive motors coupled to the drive pump and configured to receive hydraulic fluid flow from the drive pump to rotate the left side tractive elements, and first and second right side drive motors connected in series, the first and second right side drive motors coupled to the drive pump and configured to receive hydraulic fluid flow from the drive pump to rotate the right side tractive elements, the method comprising:
determining from a user controlled steering input whether a turning operation is underway;
using a steering control unit to control the articulation angle actuator to change the articulation angle of the articulation joint when a turning operation is underway;
using the steering control unit to control the steering circuit, having the left side drive motors connected in series and the right side drive motors connected in series, to allow left and right side tractive elements of the articulated power machine to rotate independently when controlling the articulation angle actuator to change the angle of the articulation joint during the turning operation, and not when a turning operation is not underway, comprising:
directing hydraulic fluid from the drive pump through the first left side drive motor and through the second left side drive motor before returning to the drive pump; and
directing hydraulic fluid from the drive pump through the first right side drive motor and through the second right side drive motor before returning to the drive pump.

15. The method of claim 14, wherein the first left side drive motor is a left front drive motor and the second left side drive motor is a left rear drive motor and the first right side drive motor is a right front drive motor and the second right drive motor is a right rear drive motor, wherein using the steering control unit to control the steering circuit to allow the left and right side tractive elements to rotate independently further comprises using the steering control unit to allow the left front drive motor and the left rear drive motor to turn in an opposite direction from the corresponding right front drive motor and right rear drive motor when the articulated power machine is not moving forward or backward while the turning operation is underway.

16. The method of claim 14, wherein the steering circuit further includes a cross-feed loop configured to selectively provide a fluid path from a first connection between the series connected left side drive motors to a second connection between the series connected right-side drive motors, wherein using the steering control unit to control the steering circuit to allow the left and right side tractive elements of the articulated power machine to rotate independently further comprises using the steering control unit to generate a control signal to control a control valve of the cross-feed loop to provide the fluid path through the cross-feed loop during the turning operation and to not provide the fluid path through the cross-feed loop when a turning operation is not underway.

17. The method of claim 16, wherein using the steering control unit to generate the control signal further comprises using the steering control unit to generate the control signal in response to the user controlled steering input.

18. The method of claim 16, wherein using the steering control unit to generate the control signal to control the control valve of the cross-feed loop to provide the fluid path through the cross-feed loop during the turning operation further comprises using the steering control unit to allow the left front drive motor and the left rear drive motor to turn in an opposite direction from the corresponding right front drive motor and right rear drive motor when the articulated power machine is not moving forward or backward during the turning operation.

* * * * *